US008555264B2

(12) United States Patent
Ohrstrom

(10) Patent No.: US 8,555,264 B2
(45) Date of Patent: Oct. 8, 2013

(54) SYSTEM AND METHOD FOR EFFICIENT COMPILATION AND INVOCATION OF FUNCTION TYPE CALLS

(75) Inventor: Fredrik Ohrstrom, Stockholm (SE)

(73) Assignee: Oracle International Corporation, Redwood Shores, CA (US)

(*) Notice: Subject to any disclaimer, the term of this patent is extended or adjusted under 35 U.S.C. 154(b) by 448 days.

(21) Appl. No.: 13/007,400

(22) Filed: Jan. 14, 2011

(65) Prior Publication Data

US 2012/0185834 A1    Jul. 19, 2012

(51) Int. Cl.
*G06F 9/44* (2006.01)
*G06F 9/45* (2006.01)

(52) U.S. Cl.
USPC ............ 717/148; 717/116; 717/153; 717/154

(58) Field of Classification Search
None
See application file for complete search history.

(56) References Cited

U.S. PATENT DOCUMENTS

| | | | | |
|---|---|---|---|---|
| 7,150,003 | B2 * | 12/2006 | Naumovich et al. | 717/108 |
| 7,694,274 | B2 * | 4/2010 | Meijer et al. | 717/114 |
| 7,797,669 | B1 * | 9/2010 | Rehof et al. | 717/100 |
| 8,312,439 | B2 * | 11/2012 | Kielstra et al. | 717/148 |
| 8,327,327 | B2 * | 12/2012 | Bierhoff et al. | 717/116 |
| 2004/0103404 | A1 * | 5/2004 | Naumovich et al. | 717/136 |
| 2007/0028210 | A1 * | 2/2007 | Meijer et al. | 717/114 |
| 2008/0313613 | A1 * | 12/2008 | Bierhoff et al. | 717/116 |
| 2011/0131556 | A1 * | 6/2011 | Tatsubori | 717/137 |

OTHER PUBLICATIONS

Alpern et al., Efficient Implementation of Java Interfaces: Invokeinterface Considered Harmless, published ACM SIGPLAN Notices 2001, pp. 1-17.*
Benton et al., Compiling Standard ML to Java Bytecodes, publihsed ICFP '98, 1998, pp. 129-140.*
Lindlan et al., A Tool Framework for static and Dynamic Analysis of Object-Oriented Software with Templates, published by IEEE/ACM SC2000 Conference, 2000, pp. 1-11.*
Mnemonics: type-safe bytecode generation at run time, published by Springer Science+Business Meida, LLC 2011, pp. 371-407.*
Bracha et al., Closures for the Java Programming Language (v.05), published online before Nov. 5, 2009, pp. 1-7.*
Bracha, G. et al., Closures for the Java Programming Language (v0.5), 9 pages, printed from http://www.javac.info/closures-v05.html on Nov. 30, 2010.
Ohrstrom, F., Generating Efficient Code for Lambdas and Function Types, 56 pages, JVM Language Summit Conference, Santa Clara, California, Jul. 24, 2010.
Closures, Langtools: Summary, closures-dev@openjdk.java.net, Copyright 2010 Oracle Corporation, 1 page, printed from http://hg.openjdk.java.net/closures/closures/langtools on Nov. 30, 2010.

* cited by examiner

Primary Examiner — Tuan Q. Dam
Assistant Examiner — Zheng Wei
(74) Attorney, Agent, or Firm — Fliesler Meyer LLP

(57) ABSTRACT

A system and method for efficient compilation and invocation of function type calls in a virtual machine (VM), or other runtime environment, and particularly for use in a system that includes a Java Virtual Machine (JVM). The system comprises a virtual machine for executing a software application; a memory space for the application byte code comprising callsites generated using a function type carrier; a bytecode to machine code compiler which performs MethodHandle invocation optimizations; a memory space for the compiled machine code; and a memory space for storing software objects as part of the software application. The system enables carrying the function type from the original MethodHandle to a callsite in the generated bytecode, including maintaining generics information for a function type acquired from a target function, and generating a callsite based on the generics information for the function object invocation.

17 Claims, 7 Drawing Sheets

```
504  static long test();
       Code:
         Stack=5, Locals=2, Args_size=0
506    0: invokestatic #7;
           //Method initializeTarget:()LTest;
       3: astore_0
508    4: sipush 4712
       7: istore_1
510    8: aload_0
512    9: ldc #8; //String A
514    11: ldc #9; //String B
516    13: iload_1
518    14: i2l
       15: invokevirtual #10;
           //Method invokeGeneric:
           (Ljava/lang/Object;Ljava/lang/String;J)J
520    18: lreturn
```

```
500
static long test()
{
  Function(Object,String,long)->long f
    = initializeTarget();
  int i = 4712;
  return f.invoke("A","B",i);
}
```

```
502
? extends Object,
? extends String,
? extends Long,
? extends Long
```

FIG 5

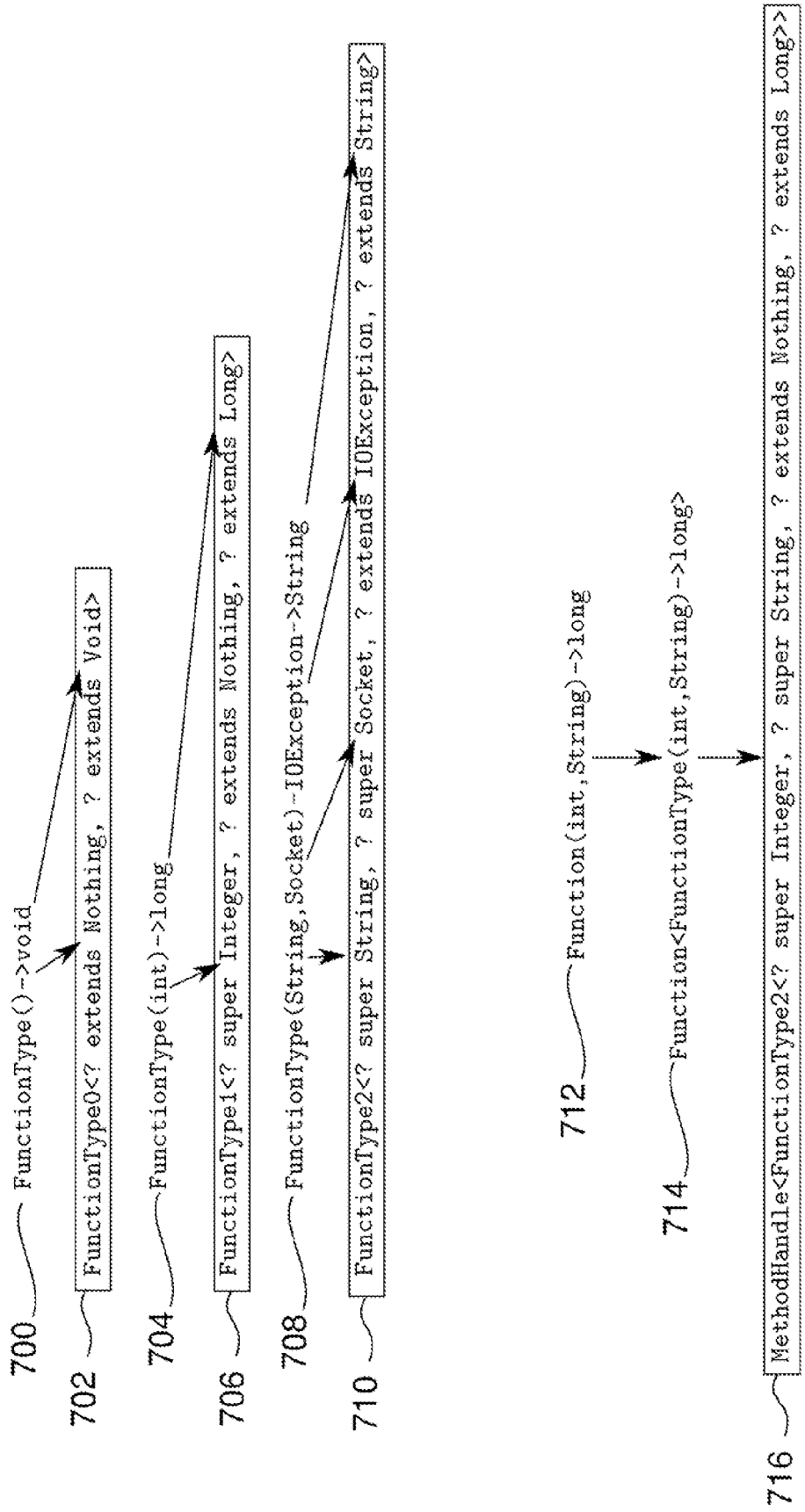

SYSTEM AND METHOD FOR EFFICIENT COMPILATION AND INVOCATION OF FUNCTION TYPE CALLS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to programming languages and their implementation using virtual machines, and is particularly related to a system and method for generating efficient code for function type calls in a Java virtual machine or similar environment.

BACKGROUND

The Java programming language is a popular programming language with a very large worldwide installed user base. One of its primary advantages is that Java can be used with most forms of computer hardware, from small embedded controllers, mobile phones, and laptops, to larger desktop workstations, web servers, and even supercomputers. Generally, a Java program is compiled using a java compiler (javac) into bytecode. This bytecode is then executed by a Java Virtual Machine (JVM) running atop the computer or other hardware. This allows the original Java program to be run unmodified in different hardware environments.

However, despite its widespread usage, Java lacks some programming language features that are part of many other programming languages, including, for example, the availability of function types. In other programming languages, function types can be used to reference functions without knowing exactly which function is referenced. However, since Java lacks function types, a Java programmer has to provide a workaround, typically by creating interfaces with a single method to simulate function types. These are the general areas that embodiments of the present invention are intended to address.

SUMMARY

Disclosed herein is a system and method for efficient compilation and invocation of function type calls in a virtual machine (VM), or other runtime environment, and particularly for use in a system that includes a Java Virtual Machine (JVM). Current techniques in Java for implementing function types using interface calls are neither efficient nor flexible. Embodiments of the present invention address this problem by providing a system and method for creating function references (method handles or Method Handles) to a target function, invoking efficiently on such a MethodHandle from a callsite, and reusing the existing generics infrastructure within the Java language to carry the types during javac compile time from the target function to the callsite. In accordance with an embodiment, the system comprises a virtual machine for executing a software application; a memory space for the application byte code comprising callsites generated using a function type carrier; a bytecode to machine code compiler which performs MethodHandle invocation optimizations; a memory space for the compiled machine code; and a memory space for storing software objects as part of the software application.

The system enables carrying the function type from the original MethodHandle to a callsite in the generated bytecode, including maintaining generics information for a function type acquired from a target function, and generating a callsite based on the generics information for the function object invocation.

BRIEF DESCRIPTION OF THE FIGURES

FIG. 5 shows an illustration of how the system can be used for compiling an invocation of function object into an invocation on a MethodHandle with the assistance of a function type carrier, in accordance with an embodiment.

FIG. 7 shows an illustration of how the system can be used for transforming a Java function type syntax into Java generics suffixed to a Method Handle, in accordance with an embodiment.

DETAILED DESCRIPTION

Figure 1:
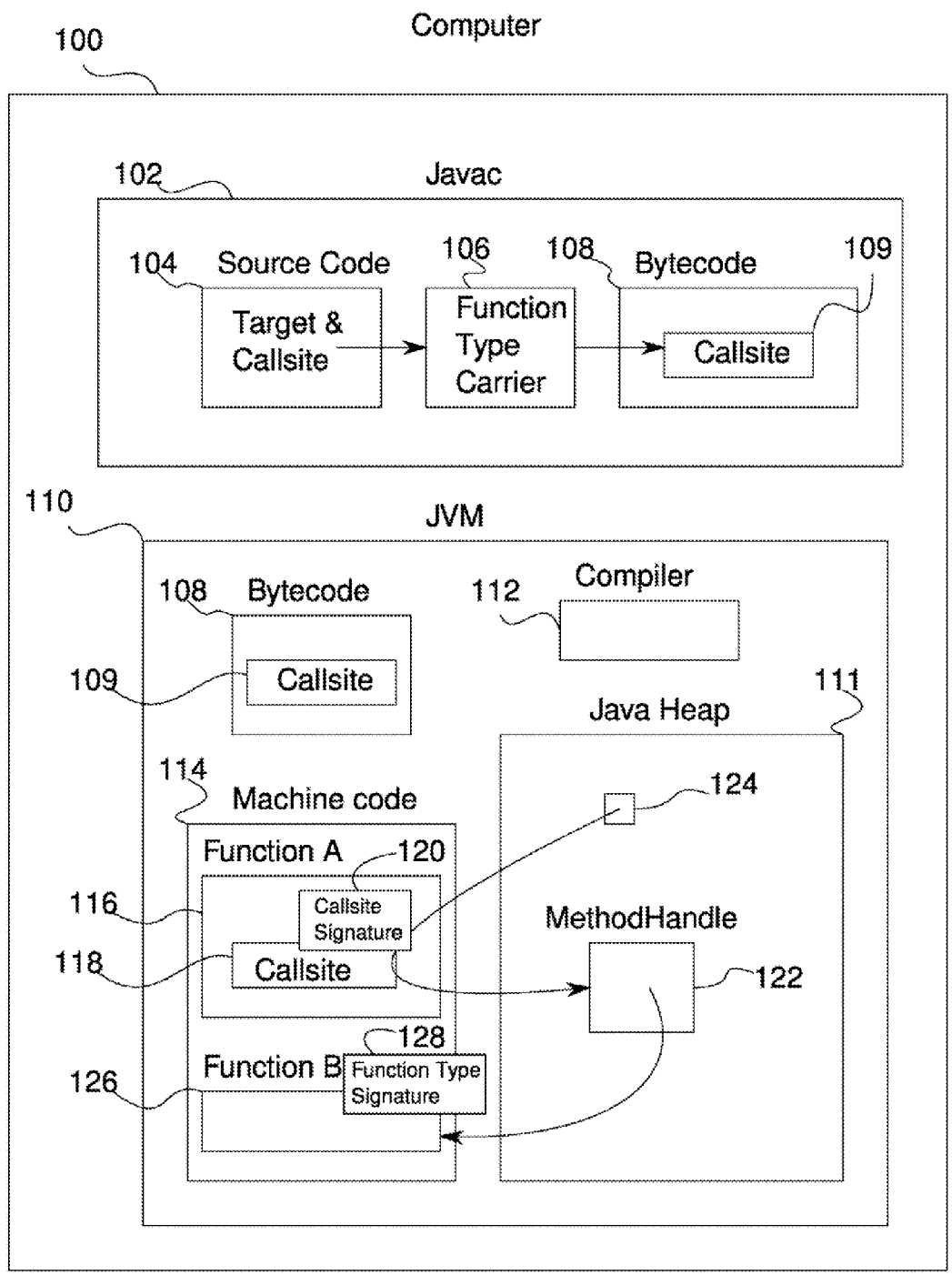
FIG. 1 shows an illustration of a system for efficient compilation and invocation of function object, in accordance with an embodiment.

As described above, despite its widespread usage, Java lacks certain programming language features that are part of almost every other programming language, including the availability of function types. In many other programming languages, function types can be used to reference functions without knowing exactly which function is referenced. Since Java lacks function types, a Java programmer has to provide a workaround, typically by creating interfaces with a single method to simulate function types.

For example, a commonly used interface from the AWT library is the ActionListener interface:

```
interface ActionListener
{
    void actionPerformed(ActionEvent e);
}
```

The ActionListener interface shown above is a substitute for the lack of a function type that represents a function that takes an ActionEvent as the single argument and returns void. The actual name actionPerformed is irrelevant, since it does not say anything about what happens when it is invoked. Unfortunately, because of this workaround, the ActionListener interface is not assignable to any other function type taking a single ActionEvent and returning void. For example, another library Z, that is not aware of the ActionListener interface, might create their own interface ActionHandler:

```
Interface ActionHandler
{
    void doAction(ActionEvent e);
}
```

The two libraries AWT and Z will have trouble connecting action callbacks between each other, since an ActionHandler interface cannot be assigned to an ActionListener variable, and vice versa.

Yet a further workaround to address this issue would be to automatically wrap the ActionHandler interface inside an ActionListener interface if it is desired to pass an ActionHandler as an Action Listener. However, this further workaround introduces an extra object and an extra call that is both unnecessary and inconvenient.

The above problems indicate it would be desirable to add function types to Java. Unfortunately this is quite difficult, because the newly added function types must integrate well with the existing Java generics, the implementation and specification of which is complex, and for which any changes can take several man-years to execute.

A limiting constraint of the existing generics is that it cannot handle primitives (i.e. int, long, float, double, char, byte, short, or boolean primitives). To improve the situation for the Java programmer, the Java compiler javac can automatically replace a primitive (e.g. an int) with its wrapper object (e.g. Integer) at javac compile time (i.e. box) whenever an int is passed as an argument to a function. Javac can also extract the primitive out from the wrapper object (i.e. unbox) whenever needed. This makes it possible to create List<Integer> and use it with primitives within the Java language. The programmer can therefore use the (supported) collection class (List<Integer>) as if it was a (non-supported) List<int> collection class.

Unfortunately, use of the above technique comes with a heavy performance cost, since Integer objects require a full Java object allocated on the Java heap, as compared to a 32 bit int that is 4 bytes long and that can be stored in a register or on the stack. The net result is that List<Integer> in a typical JVM (such as Oracle JRockit, or a JVM that runs on a 32-bit platform), would require four times as much memory than a theoretical List<int> implementation. For other JVMs, and for 64-bit platforms, the increase in memory usage may be even larger.

However, generics can still be used to define generic interfaces. Thus there is a trivial solution for function types, by using generics to declare function types of different arities:

```
interface Function0<A,R>
{
    R invoke ( );
}
interface Function1<A,R>
{
    R invoke (A a);
}
interface Function2<A,B,R>
{
    R invoke (A a, B b);
}
```

Unfortunately, such a solution is still not satisfactory, because every call to a function type representing Function1<Integer,Integer> requires boxing and unboxing for each call, even though primitive ints (e.g. 1, 7, 4711) are passed as arguments every time. This may not waste storage capacity, but does waste system performance, because of the extra processing needed to box, unbox and to garbage collect the temporary boxed values.

Because of the performance impact, previous attempts of creating efficient function types in Java have required that unique function types be created for each combination of primitives and objects. In some cases a large number of interfaces must be created manually. The following is an example from the concurrency programming library from JSR166y extra (described at http://gee.cs.oswego.edu/dl/jsr166/dist/extra166ydocs/, which is incorporated herein by reference), wherein a number of unique interface have been created manually by the library designer. These interfaces only cover a subset of all potential function types. For example, only 1 and 2 argument functions are allowed using either long or double primitives:

```
interface DoubleAndIntToInt
{
    int op(double a, int b);
}
interface IntAndIntToLong
{
    long op(int a, int b);
}
interface IntAndObjectToObject<B,R>
{
    R op(int a, B b);
}
```

The process can potentially be automated, and in the implementation (described at http://hg.openjdk.java.net/closures/closures/langtools/, also incorporated herein by reference) of function types provided in the BGGA proposal (described at http://www.javac.info/closures-v05.html, also incorporated herein by reference) these interfaces are automatically created by javac.

However, the number of potential function types will be very large if every combination is to be covered in advance, and so this is not a sustainable way of implementing function types.

Thus, there is a conflict between either slow performance, or a very large number of unique interfaces. It would be useful to allow adding efficient function types to Java, without modifying the generics subsystem within the Java compiler javac, and without having a huge number of interfaces.

To address this, disclosed herein is a system and method for efficient compilation and invocation of function type calls in a virtual machine (VM), or other runtime environment, and particularly for use in a system that includes a Java Virtual Machine (JVM). While current techniques in Java for implementing function types using interface calls are neither efficient nor flexible, embodiments of the present invention address this problem by providing a system and method for creating function references (method handles or Method Handles) to a target function, invoking efficiently on such a MethodHandle from a callsite, and reusing the existing generics infrastructure within the Java language to carry the types during javac compile time from the target function to the callsite. In accordance with an embodiment, the system comprises a virtual machine for executing a software application; a memory space for the application byte code comprising callsites generated using a function type carrier; a bytecode to machine code compiler which performs MethodHandle invocation optimizations; a memory space for the compiled machine code; and a memory space for storing software objects as part of the software application. The system enables carrying the function type from the original MethodHandle to a callsite in the generated bytecode, including maintaining generics information for a function type acquired from a target function, and generating a callsite based on the generics information for the function object invocation.

In accordance with an embodiment, the method handle (Method Handle) is used to acquire a reference to a Java method. Such a method handle can be invoked from any callsite using the method invokeGeneric. In accordance with an embodiment, the JVM at runtime, prevents method handle invocations that must fail because the callsite arguments are not compatible with the target arguments. Thus, the JVM will test if the target function can be safely called, and, if this is the case, then it will invoke the target; otherwise it will throw an exception.

Unsafe attempts can include, for example: passing a String for use as a Socket, passing an int for use as a String.

Safe attempts can include, for example: passing an int for use as an Object (the int will be automatically boxed at runtime), passing an Integer for use as an int (the Integer will be automatically unboxed at runtime) and passing a String for use as an Object. The same kind of conversions hold for the return value from the function.

In accordance with an embodiment, the system provides a way for the JVM to generate efficient callsites for such generic invocations, as long as the target function is co/contra variant with respect to the callsite. Embodiments of the present invention also provide a way for the Java compiler javac to carry the function types and to compile a callsite in bytecode using unmodified Java generics that are co/contra variant relative the target.

FIG. 1 shows an illustration of a system for efficient compilation and invocation of function object, in accordance with an embodiment. As shown in FIG. 1, in accordance with an embodiment, the system includes a computer 100 on which a javac compiler process 102 executes. In this example, the javac compiler process transforms the source code 104 comprising a target function and a callsite, using a function type carrier 106, into bytecode 108 comprising a callsite 109 adjusted using the function type carrier 106. The act of carrying the types from the target function to the callsite is typically performed by the javac compiler. In accordance with an embodiment, the final adjustment of the callsite is then performed in a manner that makes sense with respect to the particular optimizations described below.

As further shown in FIG. 1, the computer 100 includes a JVM 110 executing thereon. The JVM comprises a memory area 108 for the bytecode previously generated, and a memory area 111 for the Java heap for storing application objects. The JVM also comprises a bytecode to machine code compiler 112.

The bytecode to machine code compiler 112 transforms the bytecode 108 into machine code 114, which in turn is similarly stored in memory space within the JVM.

In accordance with an embodiment, the source code can be compiled into a function A 116 that comprises a callsite 118 that passes arguments using a callsite signature 120 (for example, taking the arguments (Object,String,long) and returning a long).

Prior to execution of the callsite, the target is fetched, for example, by acquiring a MethodHandle 122 from some storage location 124 in the Java heap. (Alternative means of acquiring the MethodHandle can be used, such as, e.g. acquiring the MethodHandle from a register, or the stack frame.) The MethodHandle 122 references a target function B 126, that has a function type signature 128. The target function type can be any of those types that can be safely called from the callsite, as described above. If it is determined to be not safe, then the MethodHandle will throw an exception. If the function type carrier and its associated callsite are created as described herein, then it will be safe to call the function type 128 from the callsite type 120.

Figure 2:
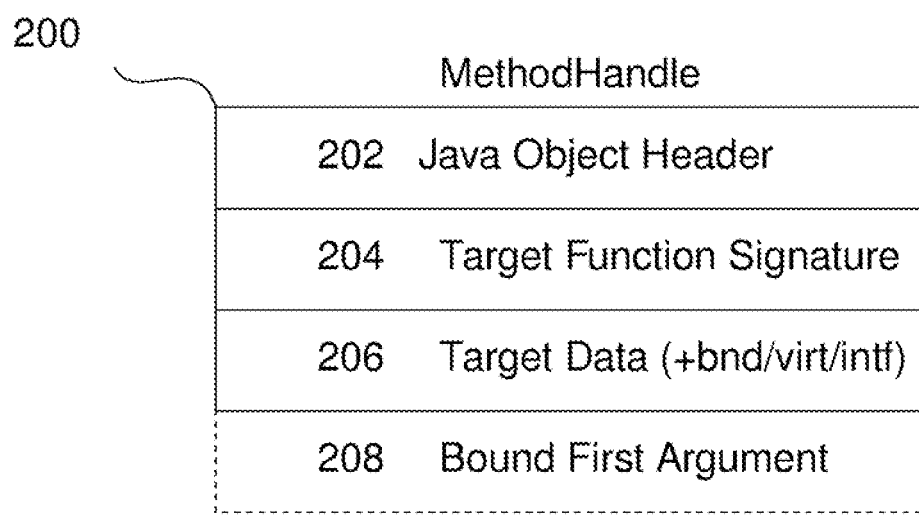
FIG. 2 shows an illustration of a memory structure for a MethodHandle used to maintain references to target Java methods or functions and invoke on these from callsites, in accordance with an embodiment.

FIG. 2 shows an illustration of a memory structure for a MethodHandle used to maintain references to target Java methods or functions and invoke on these from callsites, in accordance with an embodiment. As shown in FIG. 2, an implementation of the MethodHandle can use a data structure 200 to accomplish the safe invocation in an efficient way. Since the Method Handle is a normal Java object it must include a standard Java header 202. This usually includes a pointer to a class definition, and flag bits to handle locking and garbage collection.

In accordance with an embodiment, the MethodHandle also includes a pointer to a definition of the function type of the target function 204. This is the type that will decide if it is safe to invoke on the MethodHandle from a particular callsite.

In accordance with an embodiment, the target function is encoded as a target data 206. The target data can be a single address if the target function is static or private. If the function is virtual, or if it is an interface function, then the target data can instead be an index into a virtual table. In such instances, the receiver is expected to be passed as the first argument to the MethodHandle invocation.

In accordance with an embodiment, the MethodHandle can also store the receiver 208 to be supplied when the method handle is invoked upon.

In accordance with an embodiment, the target function type can be stored as a pointer to a Java object comprising the definition of the arguments and the return value, for example as an array of Class objects.

In accordance with an embodiment, the target data can use the most significant bit to signal that the target is not a direct address that can be called directly. This makes it possible to use a single compare-with-zero to detect if the target needs special attention, (i.e. a lookup in the virtual table, or inserting a bound receiver).

Figure 3:
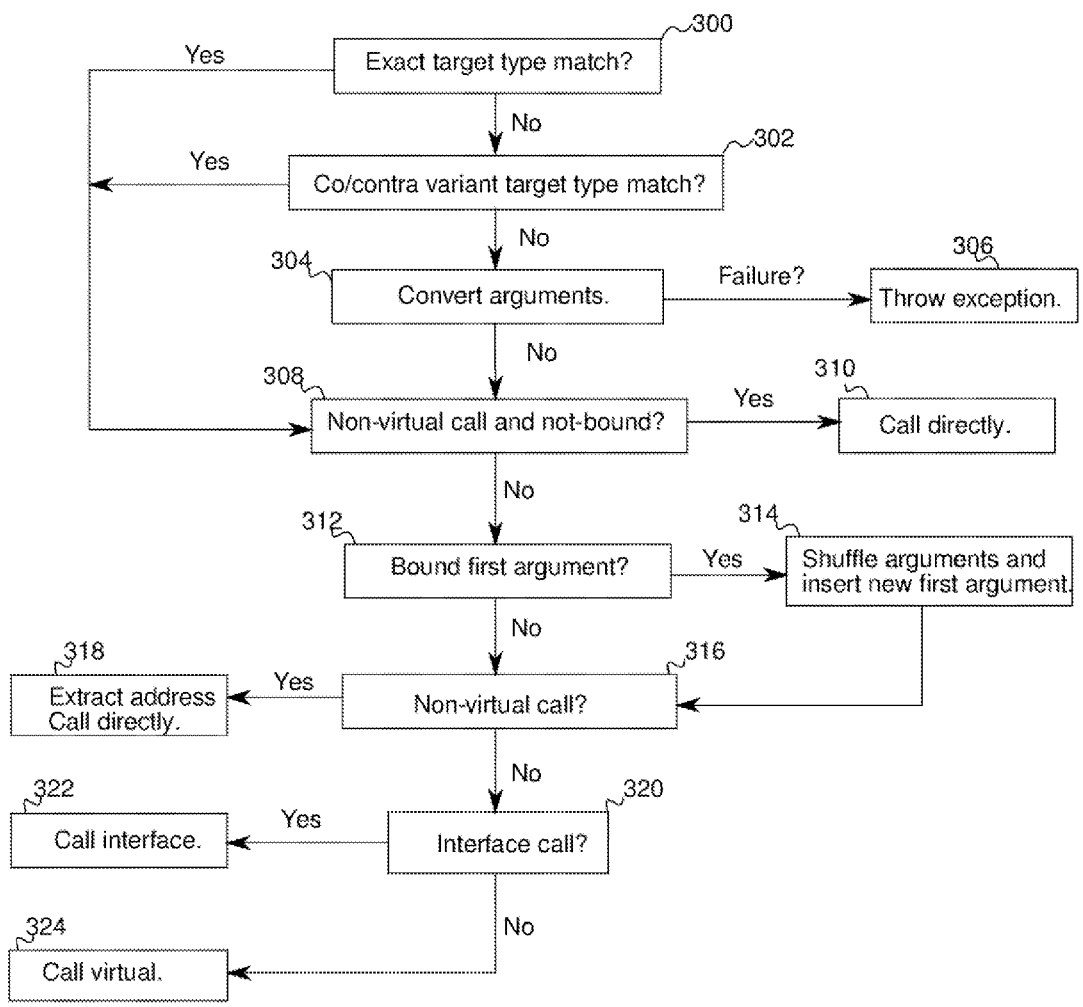
FIG. 3 shows a flowchart of a method to efficiently invoke on a MethodHandle from a callsite even when the exact target function type is not known before the callsite is executed, in accordance with an embodiment.

FIG. 3 shows a flowchart of a method to efficiently invoke on a MethodHandle from a callsite, even when the exact target function type is not known before the callsite is executed, in accordance with an embodiment. As shown in FIG. 3, the callsite generated by the compiler (or executed within an interpreter) begins, at step 300, by loading the function type from the MethodHandle, and comparing it to the function type representing the callsite.

If the function types are not identical, then, at step 302, the callsite tests if the types are co/contra variant, i.e. if it is still safe to directly call the target.

If, at step 304, they are not guaranteed to be co/contra variant, then the callsite proceeds with attempt to fully convert all the arguments. If this conversion fails (at step 306), then an exception is thrown.

At step 308, the target data is loaded from the Method Handle and compared to zero. If the target data is positive (i.e. the most significant bit is not set), then this is an immediate address, and the callsite can, at step 310, proceed to call the target data directly.

At step 312, the second most significant bit is tested. If this second most significant bit is also set, then the MethodHandle is bound, and, at step 314, the bound receiver is loaded. The arguments are shuffled to accommodate the new first argument. For example, if the arguments were stored in rsi,rdi,rax, then rbx:=rax, rax:=rdi, rdi:=rsi and rsi:=loaded bound receiver.

At step 316, the third most significant bit is tested. If this third most significant bit is set, then the target is immediate, and the target address is extracted (at step 318) from the target data, by masking the top three bits. If the third most significant bit was not set, then this is either an invokevirtual call or an invokeinterface call and this can be determined, at step 320, by examining the type of the first argument of the function type acquired from the Method Handle (204 above).

If this is an interface call, then at step 322, the top three bits are masked and the remaining bits of the target data used as an index into the interface table, for the interface type extracted from the first argument.

If this is a virtual call, then at step 324, the top three bits are masked and the remaining bits of the target data used as an index into the virtual table, for the class type extracted from the first argument.

Although the above description describes various steps that can be performed in accordance with a particular embodiment, it will be evident that in accordance with other embodiments, other steps and sequences of steps can be used.

Figure 4:
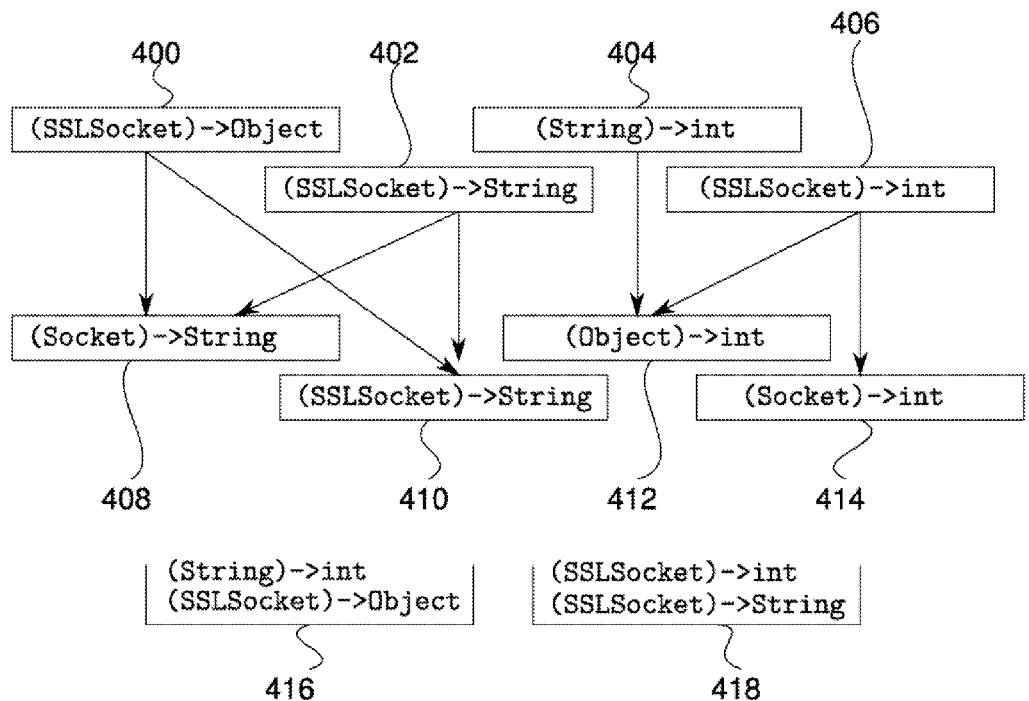
FIG. 4 shows an illustration of how the system can perform an efficient test to determine if co/contra variance applies in a function call, in accordance with an embodiment.

FIG. 4 shows an illustration of how the system can perform an efficient test to determine if co/contra variance applies in a function call, in accordance with an embodiment. As shown in FIG. 4, different callsites (illustrated here as callsites 400, 402, 404, 406) can safely call different functions with the function types 408, 410, 412, 414, in such a way that callsite 400 can safely call function types 408 and 410 because the argument of the target function type is the same or less specified than the callsite argument (i.e. it is contra variant), and because the return value is the same or more specified than the callsite argument (i.e. it is co variant).

For the same reason callsite 402 can safely call function type 408 and 410, callsite 404 can safely call function type 412 only, and callsite 406 can safely call function types 412 and 414.

If it was desired to encode the can-safely-call relationship between function types in a trivial way, one could, e.g. create a matrix of boolean values, where the calling function type is the row and the target function type is the column. In this scenario, if the boolean value true is stored in this location in the matrix, then it would be safe to make that call. Unfortunately, such a simple solution would waste much memory in normal Java programs with a very large number of function types, since the size of the matrix would grow with the square of the number of function types.

In accordance with an embodiment, the system can allow for compressing or reducing the required size of the lookup tables for co/contra variance, with only a small reduction in performance compared to the above-described trivial solution.

In accordance with an embodiment, first, function types that are incompatible are placed together in buckets. As used herein, the definition of a bucket of incompatible function types is that there is no callsite that can safely call at more than one of the target function types stored in that bucket. For example, as shown in FIG. 4, bucket 416 contains the function types (String)→int and (SSLSocket)→Object. Since String and SSLSocket only share the common ancestor Object, there is no callsite in this bucket that could safely call both types of functions. The same is true for the bucket 418. An optimal solution that searches for the fewest buckets, given a particular set of function types, is an NP-complete problem, but since the optimal packing is not needed it can be solved relatively fast.

As further shown in FIG. 4, a compressed table 420 then lists all the found function types, including both target function types and callsite function types. Each function type in the compressed table has an identifier and an index. For example, as shown in FIG. 4, the function type (SSLSocket)→Object has the identifier A and the index 1. Each function type also has an array of buckets that corresponds to the indexes stored in that function type. Thus, in the example shown in FIG. 4, bucket 422 represents the index 1, and buckets 424, 426, 428 represent indices 2, 3, and 4 respectively.

The compressed table 420 can now be used to test if a particular callsite (e.g. 430) (SSLSocket)→Object can safely call a particular target with the particular function type (e.g. 432) (Socket)→String. First, the identifier 434 and the index 436 of the callsite are determined (in the example shown in FIG. 4, these values are A and 1 respectively). Then, the appropriate bucket array 438 is fetched from the target function type 432 (Socket)→String, and the appropriate bucket 440 with index 1 is examined, to determine if the call is safe. In the example illustrated in FIG. 4, this call is indeed safe, because the callsite identifier A can be found in the target bucket 440. If the target function type had not been compatible with the callsite type, then the bucket would either contain another type identifier, or would be empty.

FIG. 5 shows an illustration of how the system can be used for compiling an invocation of function object into an invocation on a MethodHandle with the assistance of a function type carrier, in accordance with an embodiment. As shown in FIG. 5, the source code 500 of a function (in this example a test function), written in a Java-like language that, in accordance with an embodiment, is extended with function types, is compiled with the help of a function type carrier 502 that is extracted from the source code by the javac compiler.

The bytecode presented in FIG. 5 is presented as the output from the command "javap -v". In accordance with an embodiment, this disassembled output begins with a header part 504, and is then followed by the initial call part 506 to initialize the function object. As can be seen in the bytecode part 506, the function type carrier is not present in the bytecode; the only known type is that the return value from initializeTarget returns a MethodHandle. (This illustrates that even if the syntax specifies Function it can be translated into the type MethodHandle. It is a matter of taste whether the function object has the name "function", "Function", "MethodHandle" or something else.) The lack of generic type information is due to the limitations of current Java bytecode. As further seen in the bytecode 506, the function object is then stored in the local variable 0.

In part 508, the compiled bytecode pushes a constant on the operand stack and stores the constant into local variable 1.

In part 510, the function object is again loaded onto the operand stack, followed by part 512 where the string "A" is loaded, part 514 where string "B" is loaded, and part 516 where the constant is again loaded.

In part 518, the compiled bytecode is generated by javac using the knowledge from the function type carrier 502 to create a callsite with the type (Object,String,long)→long. It does so by replacing each wrapper type with its corresponding primitive type. That is, the type carrier can use a specification without primitives, but the generated callsite will have primitives. Thus in part 518, the javac compiler introduces an i2l cast, to convert the integer to long according to the function type carrier. Importantly, this means that the current generics built into the javac compiler can be used, without modification, to carry the function types. Because of the ability for a MethodHandle invokeGeneric to be fast as long as the function types are co/contra variant, embodiments of the present invention address the long standing problem of how to introduce function types into Java without significantly modifying the javac compiler. A side effect is that callsites cannot be created with explicit Integer or Long objects. However, this is not a problem, since if a target requires such types, they will be automatically recreated according to the boxing behavior of invokeGeneric.

In part 520, the long value now residing on the operand stack is returned.

Figure 6:
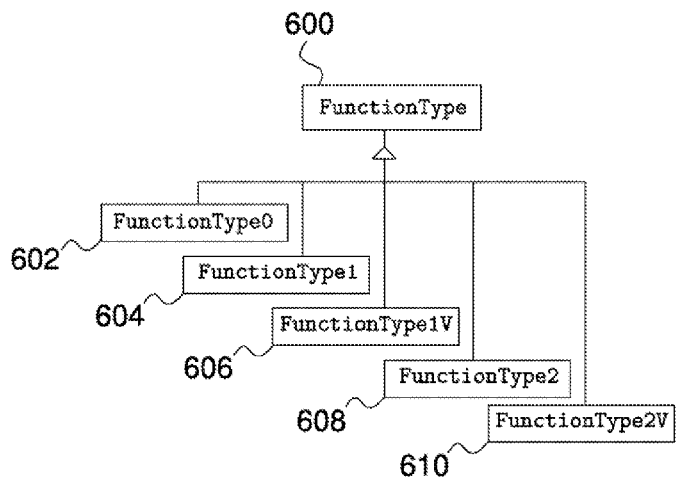
FIG. 6 shows an illustration of how the system can be used for carrying function types using generics that is compatible with existing Java generics, in accordance with an embodiment.

FIG. 6 shows an illustration of how the system can be used for carrying function types using generics that is compatible with existing Java generics, in accordance with an embodiment. As described above, a function type can be transformed to a Method Handle during javac compilation. As long as the function type carrier propagates the type of the target to the callsite such that it is co/contra variant relative the callsite, then the call using invokeGeneric will, using the co/contra variance optimization described above, be fast. FIG. 6 illustrates how function types (without primitives) tracking co/contra variance can be propagated, using the already existing generics.

As shown in FIG. 6, the class FunctionType 600 is created. This class is extended into FunctionType0 602, FunctionType1 604, FunctionType1V 606, FunctionType2 608 and FunctionType2V 610. These represent the different arities of the function types. As further shown in FIG. 6, the function types ending with V indicates that the last argument is an array and should be treated as a vararg according to standard Java.

The corresponding class definition 612 shows that the FunctionType0 is defined using generics. The generic parameter E stands for the exceptions and R stands for the return value. In FunctionType1 (with class definition 614), the generic parameter A stands for the first argument. In FunctionType1V (with class definition 616), the suffix V indicates that A must be an array. In FunctionType2 (with class definition 618), B is the type of the second argument. Function Type 2V (with class definition 620) is the function type where the second argument is the vararg.

There are in all 511 possible function types based on arities, since a Java function can never have more than 255 arguments. Thus, in FIG. 6, the sequence of classes ends with class definitions 622, and 624 that has the maximum arity.

FIG. 7 shows an illustration of how the system can be used for transforming a Java function type syntax into Java generics suffixed to a Method Handle, in accordance with an embodiment. As shown in FIG. 7, in accordance with an embodiment, the function type 700 is transformed into the function type with the correct arity 702, and the generic parameters are not simply inserted, but are instead prefixed with "? extends" to identify co-variance and "? super " to identify contra-variance. (Extends and super are already built into the current javac compiler support for generics). As the function type 700 takes no arguments, the generic parameters in 702 are only co-variant.

The function type 704 takes an integer, which is thus translated into the contra-variant "? super Integer" specification 706.

The function type 708 has two arguments that are contra-variant and an explicitly exception and return value that are co-variant in the translation 710.

We now have the necessary tools to transform a function object specification 712 into a Method Handle. In accordance with an embodiment, first the function object is replaced with a MethodHandle 714, and the single generic parameter is a function type. Then the function type is transformed as before to the correct arity combined with acceptable co/contra variance 716. A variable declared using the type specified in 716 will only allow safe assignments to other function variables. For example:

```
Object test(SSLSocket s) {
    Function(Socket)->String        f1 = initializeTarget( );
    Function(SSLSocket)->Object     f2 = f1;
    return f2.invoke(s);
}
```

This is translated into the following source code as part of the compilation process:

```
Object test(SSLSocket s) {
    MethodHandle<
        FunctionType1<? super Socket,? extends Nothing, ? extends String>> f1 = initializeTarget( );
    MethodHandle<
        FunctionType1<? super SSLSocket,? extends Nothing, ? extends Object>> f2 = f1;
    return f2.invokeGeneric(s); // invokeGeneric(LSSLSocket;)LObject;
}
```

Because Socket is a super class to SSLSocket, and because String extends Object, the existing javac generics will allow the assignment of f1 to f2. In accordance with an embodiment, the call is guaranteed to be co/contra variant, and the performance will be good because the MethodHandle.invokeGeneric can be optimized according to the description above. This addresses the problem of adding efficient function objects and function types to the Java language, without having to modify the existing generics system in the javac compiler.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for generating efficient code for function type calls in a Java virtual machine or similar environment, comprising:
a computer which includes a virtual machine for executing a software application thereon;
a memory space which stores software application bytecode that includes callsites, compiled machine code, and software objects, as parts of the software application; and
a bytecode to machine code compiler, which optimizes function reference invocations for use within the software application, including, during compilation of the bytecode and prior to execution of a particular callsite,
acquiring a function reference that references a target function and that has a function type signature associated therewith,
determining that the target function is co/contra variant with respect to the callsite,
determining that the target function type is a type that can be safely called from the particular callsite, and
if the target function type is determined to be a type that can be safely called from the particular callsite then creating the function type carrier and its associated callsite.

2. The system of claim 1, wherein the function reference is a method handle (MethodHandle).

3. The system of claim 2, wherein the method handle can be invoked from any callsite using the Java method invokeGeneric, and wherein the system enables carrying the function type from an original method handle to a callsite in the generated bytecode, including maintaining generics information for a function type acquired from a target function, and generating a callsite based on the generics information for the function object invocation.

4. The system of claim 2, wherein the method handle is stored as a data structure that includes
a header;
a definition of the function type of the target function, which is used by the system to determine if it is safe to invoke on the method handle from a particular callsite;
a target data encoding of the target function; and
an optional receiver to be supplied when the method handle is invoked upon.

5. The system of claim 4, wherein the target data is configured so that its bits signal whether the target is a direct or immediate address, and if so that the callsite can proceed to call the target data directly.

6. The system of claim 5, wherein the system uses the target data to determine whether the target is a direct or immediate address by
loading the target data from the method handle and testing the most significant bit, to determine this is an immediate address and that the callsite can proceed to call the target data directly;
testing the second most significant bit, to determine that the method handle is bound, and loading the bound receiver and shuffling the arguments appropriately; and
testing the third most significant bit, to determine that the target is immediate, and extracting the target address from the target data, by masking the top three bits and using the remaining bits of the target data either as an index into the interface table, for the interface type extracted from the first argument, or as an index into the virtual table, for the class type extracted from the first argument.

7. The system of claim 1, wherein the determining that the target function is co/contra variant with respect to the callsite includes placing function types that are incompatible together in buckets, and searching within the buckets to determine co/contra variance.

8. The system of claim 7, wherein the buckets are associated with a compressed table that lists all found function types, including target function types and callsite function types, and wherein each function type in the compressed table has an identifier, an index, and an array of buckets that corresponds to the indexes stored in that function type, and wherein the compressed table is used to test if a particular callsite can safely call a particular target with the particular function type, by
determining the identifier and the index of the particular callsite,
fetching the appropriate bucket array from the target function type, and
examining the appropriate bucket with the index of the particular callsite to determine if the call is safe.

9. A method of generating efficient code for function type calls in a Java virtual machine or similar environment, comprising the steps of:
providing a computer which includes
a virtual machine for executing a software application thereon,
a memory space which stores software application bytecode that includes callsites, compiled machine code, and software objects, as parts of the software application, and
a bytecode to machine code compiler, which optimizes function reference invocations for use within the software application, including, during compilation of the bytecode and prior to execution of a particular callsite;
acquiring a function reference that references a target function and that has a function type signature associated therewith;
determining that the target function is co/contra variant with respect to the callsite;
determining that the target function type is a type that can be safely called from the particular callsite; and
if the target function type is determined to be a type that can be safely called from the particular callsite then creating the function type carrier and its associated callsite.

10. The method of claim 9, wherein the function reference is a method handle (MethodHandle).

11. The method of claim 10, wherein the method handle can be invoked from any callsite using the Java method invokeGeneric, and wherein the system enables carrying the function type from an original method handle to a callsite in the generated bytecode, including maintaining generics information for a function type acquired from a target function, and generating a callsite based on the generics information for the function object invocation.

12. The method of claim 10, wherein the method handle is stored as a data structure that includes
a header;
a definition of the function type of the target function, which is used by the system to determine if it is safe to invoke on the method handle from a particular callsite;
a target data encoding of the target function; and an optional receiver to be supplied when the method handle is invoked upon.

13. The method of claim 12, wherein the target data is configured so that its bits signal whether the target is a direct or immediate address, and if so that the callsite can proceed to call the target data directly.

14. The method of claim 13, wherein the system uses the target data to determine whether the target is a direct or immediate address by loading the target data from the method handle and testing the most significant bit, to determine this is an immediate address and that the callsite can proceed to call the target data directly;

testing the second most significant bit, to determine that the method handle is bound, and loading the bound receiver and shuffling the arguments appropriately; and testing the third most significant bit, to determine that the target is immediate, and extracting the target address from the target data, by masking the top three bits and using the remaining bits of the target data either as an index into the interface table, for the interface type extracted from the first argument, or as an index into the virtual table, for the class type extracted from the first argument.

15. The method of claim 9, wherein the determining that the target function is co/contra variant with respect to the callsite includes placing function types that are incompatible together in buckets, and searching within the buckets to determine co/contra variance.

16. The method of claim 15, wherein the buckets are associated with a compressed table that lists all found function types, including target function types and callsite function types, and wherein each function type in the compressed table has an identifier, an index, and an array of buckets that corresponds to the indexes stored in that function type, and wherein the compressed table is used to test if a particular callsite can safely call a particular target with the particular function type, by determining the identifier and the index of the particular callsite, fetching the appropriate bucket array from the target function type, and examining the appropriate bucket with the index of the particular callsite to determine if the call is safe.

17. A non-transitory computer readable storage medium, including instructions stored thereon, which when read and executed by a computer, cause the computer to perform the steps comprising:

providing at a computer a virtual machine for executing a software application thereon, a memory space which stores software application bytecode that includes callsites, compiled machine code, and software objects, as parts of the software application, and a bytecode to machine code compiler, which optimizes function reference invocations for use within the software application, including, during compilation of the bytecode and prior to execution of a particular callsite;

acquiring a function reference that references a target function and that has a function type signature associated therewith;

determining that the target function is co/contra variant with respect to the callsite;

determining that the target function type is a type that can be safely called from the particular callsite; and if the target function type is determined to be a type that can be safely called from the particular callsite then creating the function type carrier and its associated callsite.

* * * * *

UNITED STATES PATENT AND TRADEMARK OFFICE
CERTIFICATE OF CORRECTION

| | | |
|---|---|---|
| PATENT NO. | : 8,555,264 B2 | Page 1 of 1 |
| APPLICATION NO. | : 13/007400 | |
| DATED | : October 8, 2013 | |
| INVENTOR(S) | : Ohrstrom | |

It is certified that error appears in the above-identified patent and that said Letters Patent is hereby corrected as shown below:

On title page, column 2, under Other Publications, line 1, delete "publihsed" and insert -- published --, therefor.

On title page, column 2, under Other Publications, line 7, delete "Meida," and insert -- Media, --, therefor.

In the Specification

In column 5, line 47, delete "perfomed" and insert -- performed --, therefor.

In column 6, line 35, delete "embodiment,the" and insert -- embodiment, the --, therefor.

In column 9, line 42, delete "Function Type 2V" and insert -- FunctionType2V --, therefor.

Signed and Sealed this
Eighteenth Day of February, 2014

Michelle K. Lee
*Deputy Director of the United States Patent and Trademark Office*